Dec. 5, 1961    A. HEETMAN ET AL    3,012,151
CIRCUIT FOR INDICATING MAGNITUDE OF CURRENT PULSES
Filed Feb. 16, 1959    3 Sheets-Sheet 1

INVENTORS
ALPHONSUS HEETMAN
THEODOOR HANS HORMANN
MATTHEUS JACOBUS SCHMITZ
BY
Frank R. Dufair
AGENT Dec. 5, 1961 A. HEETMAN ET AL 3,012,151
CIRCUIT FOR INDICATING MAGNITUDE OF CURRENT PULSES
Filed Feb. 16, 1959 3 Sheets-Sheet 2

INVENTORS
ALPHONSUS HEETMAN
THEODOOR HANS HORMANN
MATTHEUS JACOBUS SCHMITZ
BY
AGENT

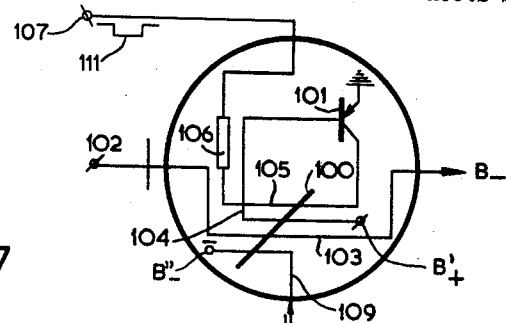
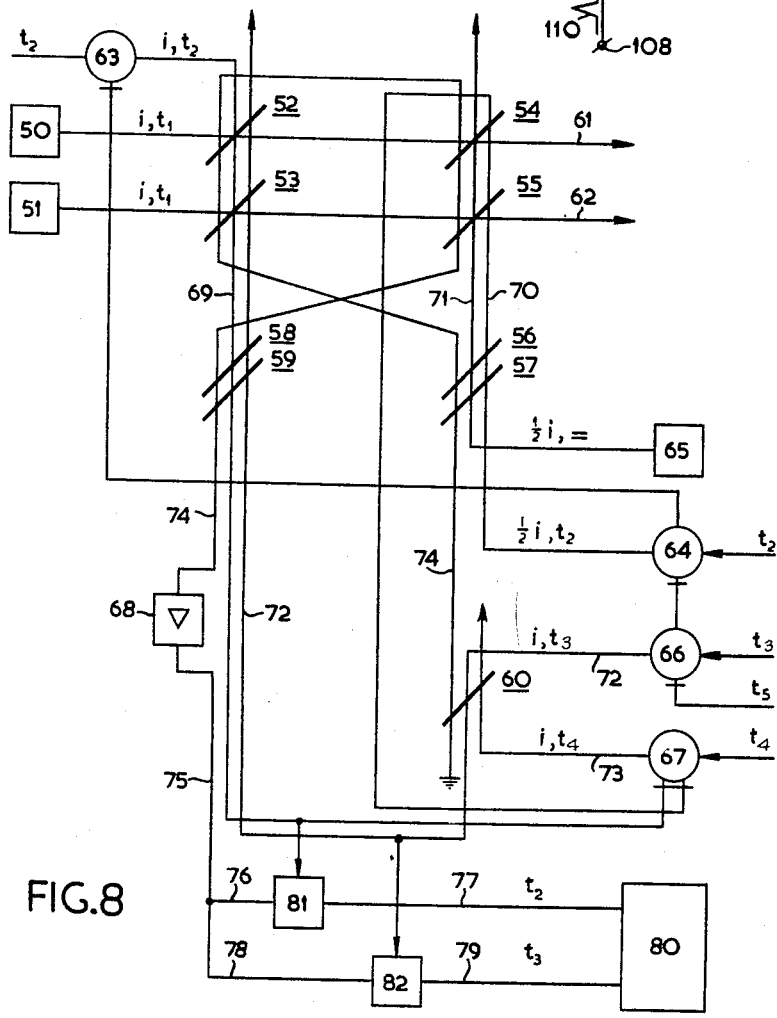

United States Patent Office

3,012,151
Patented Dec. 5, 1961

3,012,151
CIRCUIT FOR INDICATING MAGNITUDE OF CURRENT PULSES
Alphonsus Heetman, Theodoor Hans Hormann, and Mattheus Jacobus Schmitz, all of Hilversum, Netherlands, assignors to North American Philips Company, Inc., New York, N.Y., a corporation of Delaware
Filed Feb. 16, 1959, Ser. No. 793,522
Claims priority, application Netherlands Feb. 14, 1958
3 Claims. (Cl. 307—88)

This invention relates to circuit arrangements for giving a signal when the current strength of a pulse produced in a conductor has a value which does not lie within a certain range. Such circuit arrangements are required wherever it is necessary to provide pulses having current values falling only within a certain range of currents. (The range may be contracted to a single point, so that in this event the current must have a predetermined value.) When the current strength of such a pulse does not lie within the given range (which may be contracted to a point), this indicates a fault or disturbance. It will, for example, be assumed that this information is transmitted by means of an $m$-out-of-$n$ code, for example a two-out-of-five code. In this code each of the ten digits 0, 1, 2, 3, 4, 5, 6, 7, 8, 9 corresponds to pulses having a certain current strength which are produced at one of the $C_5^2 = 10$ combinations of two out of five wire. If during the transmission of information of a digit, a pulse is produced in a number of wires other than two, something has gone wrong. After passing through the receiving apparatus, the five wires can be united to a single output wire, in which consequently pulses having a certain current strength must occur. If the current strength of the pulses which can occur in each of the five wires is equal to $\frac{1}{2}i$, in the output wire of the receiving apparatus there can only occur pulses having one of the current strengths $\frac{1}{2}i$, $i$, $\frac{3}{2}i$, $2i$, $\frac{5}{2}i$; however, if in this output wire a pulse is produced having a current strength which differs from $i$, something has gone wrong. In this case, the pulses to be tested are quantised, that is to say, they can only have discrete current strengths, in the case under consideration, the current strengths 0, $\frac{1}{2}i$, $i$, $\frac{3}{2}i$, $2i$, $\frac{5}{2}i$, obviously this only holds if the pulse sources feeding the five wires produce pulses having a substantially constant current strength. This is the case inter alia if these pulses are generated by ring amplifiers of a type described hereinafter. Naturally, the signalling arrangement under consideration has current strength intervals in which the operation is uncertain. In the case under consideration, these intervals must not contain any of the points 0, $\frac{1}{2}i$, $i$, $\frac{3}{2}i$, $2i$, $\frac{5}{2}i$. The circuit arrangements known for this purpose are built up from and- and or-gates and are comparatively complicated. It is an object of the present invention to provide simpler solutions of this problem. According to the present invention, the circuit arrangement contains two cores of a rectangular magnetic material. Each core is provided with an input winding traversed by the current pulse to be tested, a reading-out winding traversed by a reading-out pulse, an output winding producing the signal, and, as the case may be, an adjusting winding and a reset winding. The windings are arranged such that the cores are previously brought into certain magnetically stable conditions, for example, by pulses in the reading-out windings or in any reset windings. If, after the occurrence of the pulse to be tested and of any simultaneous adjusting pulses (which may direct currents) reading-out pulses are produced, a signalling pulse is induced in one of the two output windings if the current strength of the pulse to be tested lies above the upper limit of the interval, and a signalling pulse is induced in the other output winding if the current strength of the pulse to be tested lies below the lower limit of the range. This result arises from the fact that the reading-out pulses cause one of the two cores to flip over. No signalling pulse is induced in any of the two output windings, however, if the pulse to be tested has a current strength lying within the range, owing to the fact that in this event none of the two cores flips over due to the occurrence of the reading-out pulses. The upper and lower limits of the interval are determined by the choice of the values of the adjusting pulses or of the numbers of turns of the various windings. Alternatively, the upper and lower limits may coincide, in which event the circuit arrangement supplies a signalling pulse if the current strength of the pulse to be tested has a value which differs from a determined value. Preferably the input windings are connected in series since they must both be traversed by the pulse to be tested. The remaining pairs of similar windings can also be connected in series, however, this is not always the case. If in par- the circuit arrangement indicates whether the pulse to be tested is too large or too small. In this event, it may even be expedient for the upper limit to be situated below the lower limit. In this event, a signalling pulse is induced in both output windings if the pulse to be checked lies in the (open) current strength interval bounded by the upper and lower limits. If the pulse to be tested does not lie within this interval, a signalling pulse is induced in only one of the two output windings. If the output windings are connected in series and the upper limit lies above the lower limit, the circuit arrangement produces a signalling pulse whenever the pulse tube to be tested has a value situated outside the interval determined by the upper and lower limits. If, in this event, the upper limit lies below the lower limit, the circuit arrangement produces a signalling pulse whenever the pulse to be tested occurs, so that the discrimination is lost.

In order to cause the circuit arrangement to operate there must occur in periodical sequence: the pulse to be tested and any adjusting pulses occurring simultaneously the reading-out pulses and any reset pulses. The instants at which these pulses occur are denoted by $t_1$, $t_2$, $t_3$. This must be understood to mean that $t_1$ does not represent a single determined instant, but any instant at which a pulse to be tested occurs, while the same holds for the instants $t_2$ and $t_3$. Thus, the sequence of instants is . . . $t_1$, $t_2$, $t_3$, $t_1$, $t_2$, $t_3$, $t_1$, $t_2$, $t_3$, . . . or, if the circuit arrangement does not need reset pulses . . ., $t_1$, $t_2$, $t_1$, $t_2$, $t_1$, $t_2$, . . . If required, each period may comprise more than three instants.

In order that the invention may readily be carried out, two embodiments thereof will now be described, by way of example with reference to the accompanying diagrammatic drawings, in which:

FIG. 7 shows the circuit diagram of a pulse source enclosed in the symbol to be used therefore.

FIG. 8 shows the circuit diagram of a circuit arrangement in accordance with the invention, in which the pulse source shown in FIG. 7 is used.

Figure 1:
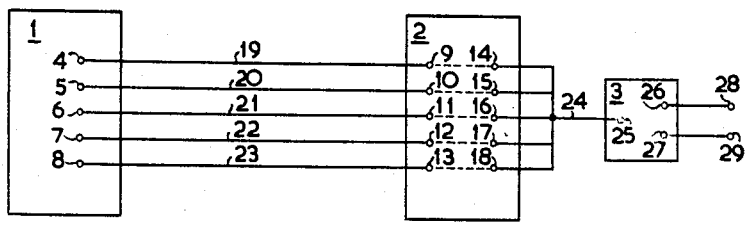
FIG. 1 shows a circuit arrangement for the transmission of a digit according to a two-out-of-five code, provided with a testing arrangement in accordance with the invention.

In FIG. 1, reference numeral 1 denotes an apparatus which can contain a certain amount of information in decimal code which can be transmitted to an apparatus 2 according to a two-out-of-five code. For this purpose, the apparatus 1 comprises a number of groups each comprising five output terminals, the number of groups being equal to the number of digits to be transmitted, while each group of five output terminals corresponds to a figure place. For the sake of simplicity, only one group of five output terminals 4, 5, 6, 7, 8 is shown in the figure. The apparatus 2 contains an equal number of groups each comprising five input terminals, of which FIG. 1 shows only the group of input terminals 9, 10, 11, 12, 13 which corresponds to the group of output terminals 4, 5, 6, 7, 8. Each output terminal of the apparatus 1 is connected to a corresponding input terminal of apparatus 2 by means of a wire, FIG. 1 showing the wires 19, 20, 21, 22, 23 only. Since for the transmission of information use is made of a two-out-of-five code, at each transmission of information a pulse is produced in two of each group of five wires, the occurrence of pulses in a number of wires other than two indicating that there has been a fault. To each group of five input terminals of the apparatus 2 corresponds a group of five output terminals of the apparatus 2. Thus, for example, the five output terminals 14, 15, 16, 17, 18 correspond to the five input terminals 9, 10, 11, 12, 13. These output terminals are connected to one another and through a wire 24, to an input terminal 25 of a testing arrangement 3 in accordance with the invention. The arrangement 3 has two output terminals 26 and 27 which are connected to wires 28 and 29 respectively.

The arrangement operates as follows. It is assumed that a digit is transmitted from the apparatus 1 to the apparatus 2. In this event a pulse appears at two of the five wires 19, 20, 21, 22, 23, for example at the two wires 19, 20. The value of each of these two pulses is assumed to be $\frac{1}{2}i$. After passing through the apparatus 2 and registering therein the digit concerned, the two pulses are fed to the testing arrangement 3 through the wire 24. Thus, this arrangement receives a pulse of value $i$, if nothing has gone wrong. If however, something has gone wrong, the testing arrangement 3 receives a pulse having a value differing from $i$. However, the pulse fed to the testing arrangement 3 can only have one of the values 0, $\frac{1}{2}i$, $i$, $\frac{3}{2}i$, $2i$, $\frac{5}{2}i$, that is to say, this pulse is quantised. It is true that it is assumed that each of the wires 19 to 23 can only contain a pulse having the value 0 or $\frac{1}{2}i$, however, this is ensured by generating each of these pulses by the flipping over of a core of rectangular magnetic material. The arrangement 3 is designed so that at its output terminal 26 a pulse is produced when the arrangement has received a pulse having a value other than $i$, through the wire 24. However, the testing arrangement 3 is comparatively complicated, inter alia owing to the fact that it contains an amplifier for amplifying the signalling pulses, so that the failure of a signalling pulse to occur can also be due to a fault in this amplifier. Hence, the arrangement 3 is preferably provided with a second output terminal 27, at which a pulse appears when the arrangement 3 has received a pulse of value $i$. Thus, when a digit is transmitted, a signalling pulse is produced either at the output terminal 26, (if something has gone wrong) or at the output terminal 27 (if everything has gone right), unless there has been a fault in the arrangement 3 itself, in which event a signalling pulse occurs either at none of the two terminals or at both terminals 26 and 27. In this manner, each fault, either in the transmission of the information or in the testing arrangement 3 itself, is indicated.

Figure 2:
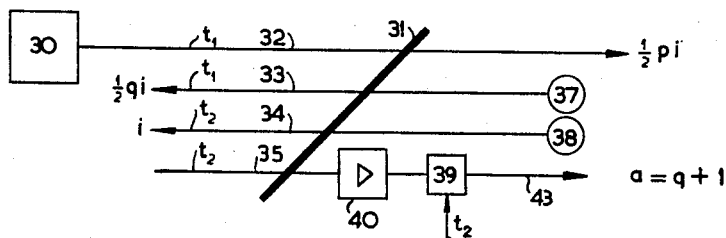
FIGS. 2 and 3 show two ring circuits which produce a signalling pulse when the pulse to be tested lies above a certain upper limit.

FIG. 2 shows a ring circuit which produces a signalling pulse when the pulse to be tested has a current strength exceeding a certain upper limit $\frac{1}{2}ai$ (where $a$ is an integer). In this figure reference numeral 30 denotes the source of the pulses to be tested, which occur at the instants $t_1$. Furthermore 31 denotes a ring made of a rectangular magnetic material, 32 an input winding, 33 an adjusting winding, 34 a reading-out winding, 35 an output winding, 37 a source supplying the adjusting pulses, which occur at the instants $t_1$ (that is to say, simultaneously with the pulses to be tested), 38 a source supplying the reading-out pulses, which occur at the instants $t_2$, 39 a gate circuit which each time is opened for the duration of a pulse at instants at which the reading out pulses occur, 40 an amplifier and 42 a conductor, in which the pulses occur which each time momentarily open the gate circuits at the instants $t_2$. The various windings are shown in the form of wires threaded through the ring 31 (windings having a single turn), however, they may obviously have more than one turn. As has been mentioned hereinbefore, the instants $t_1$ and $t_2$ succeed each other periodically that is to say, there is a series of instants . . . , $t_1$, $t_2$, $t_1$, $t_2$, $t_1$, $t_2$ . . . . In the ring 31 a certain direction of circulation is referred to as positive. If the lines of magnetic induction circulate in the ring in the positive sense, the ring is referred as being in the condition 1. If the lines of magnetic induction circulate in the ring in the negative sense, the condition of the ring is referred to as the condition 0. A pulse traversing a winding is referred as positive if it is able, with sufficient duration and current strength, to cause the ring to pass from the condition 0 to the condition 1. The pulses to be tested which occur at the instants $t_1$ have a current strength $\frac{1}{2}pi$ in the positive sense (in the FIGURES 2, 3, 4 and 5 from the left to the right; $p$=an integer; $i>0$). The simultaneously occurring adjusting pulses have the current strength $\frac{1}{2}qi$ in the negative sense ($q$=an integer). The reading-out pulses occurring at the instants $t_2$ have the value $i$ in the negative sense. It is assumed that a pulse of sufficient duration having the current strength $i$ is capable of causing the ring to change over from the condition 0 to the condition 1, but that a pulse having the current strength $\frac{1}{2}i$ is incapable thereof with certainty. If the various windings have different turns numbers, the various current strengths must be reduced to one winding, but this is so obvious that it will not be described more fully hereinafter. Alternatively, in the calculations ampere turns can be used instead of current strengths.

The circuit arrangement operates as follows. At an instant $t_2$, the ring is brought into the condition 0, provided that it was not in this condition already. If now $\frac{1}{2}pi-\frac{1}{2}qi \geq i$, and hence $p \geq q+2$, the pulses occurring in the windings 32 and 33 at the next subsequent instant $t_1$ cause the ring to pass to the condition 1. The negative pulse induced in the output winding by this flipping over of the ring is stopped by the gate circuit 39 which is closed at this instant. If desired, the gate circuit 39 can be replaced by a diode having a pass-direction towards the right. If, now, at the next subsequent instant $t_2$ a reading out pulse occurs, the ring is restored to the condition 0, so that in the output winding 35 a positive pulse is induced which is amplified in the amplifier 40 and is passed by the gate circuit 39 which now is open (or by a diode having a pass direction towards the right). If, however $$\tfrac{1}{2}pi - \tfrac{1}{2}qi \leq \tfrac{1}{2}i$$

and consequently $p \leq q+1$, the ring remains in the condition 0, in spite of the pulses which at the instant $t_1$ are produced in the input winding and the adjusting winding. Hence, the occurrence of the reading out pulse at the next subsequent instant $t_2$ does not cause the ring to pass to another condition, that is to say no pulse is induced in the output winding 35. Thus for this arrangement $$a = q+1$$

it operates in a two-stroke cycle. If $q=0$ ($a=1$), the adjusting winding can be dispensed with. If $q=1$ ($a=2$) or $q=-1$ ($a=0$), the adjusting pulses can be replaced by a direct current provided that the reading-out pulses have at least the current strength $(1-\frac{1}{2}q)i$ (that is to say $\frac{1}{2}i$ when $q=1$ and $\frac{3}{2}i$ when $q=-1$).

Figure 3:
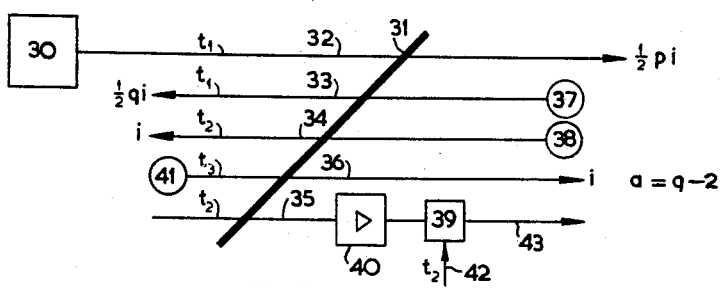

FIG. 3 shows another ring circuit which supplies a signalling pulse when the pulse to be tested has a current strength exceeding a certain upper limit $\frac{1}{2}ai$. This circuit differs from the one shown in FIG. 2 in that it has a reset winding 36, which at instants $t_3$ is traversed by pulses having the current strength $i$ in the positive sense. These pulses are supplied by a source 41. The circuit operates as follows: At an instant $t_3$, the ring 31 is brought into the condition 1 by a reset pulse. If now $\frac{1}{2}qi-\frac{1}{2}pi \leq \frac{1}{2}i$ and hence $p \geq q-1$, the ring 31 remains in the condition 1, in spite of the pulse to be tested and the adjusting pulse which occur simultaneously at the instant $t_1$. The subsequent reading-out pulse occurring at the instant $t_2$ produces a signalling pulse in the output winding 35, which is amplified in the amplifier 40 and is passed by the gate circuit 39 which now is open. However if $\frac{1}{2}qi-\frac{1}{2}pi \geq i$, and hence $p \leq q-2$, the ring 31 is restored to the condition 0 at the instant $t_1$ and the reading-out pulse which occurs at the instant $t_2$ does not produce a signalling pulse in the output winding. Thus, for this circuit, $a=q-2$.

Figure 4:
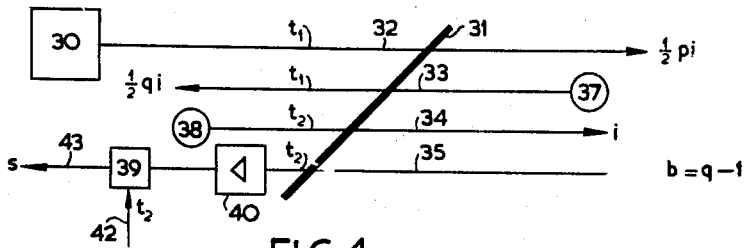
FIGS. 4 and 5 show two ring circuits which produce a signalling pulse when the pulse to be tested lies below a certain lower limit.

FIG. 4 shows a ring circuit which produces a signal when the pulse to be tested has a current strength below a certain lower limit $\frac{1}{2}bi$. This circuit arrangement is evolved from the one shown in FIG. 2 by substituting $-p$ and $-q$ for $p$ and $q$ and by furthermore interchanging positive and negative (in the figure this amounts to interchanging the right-hand and the left-hand side). Thus, for this circuit arrangement $b=q-1$.

Figure 5:
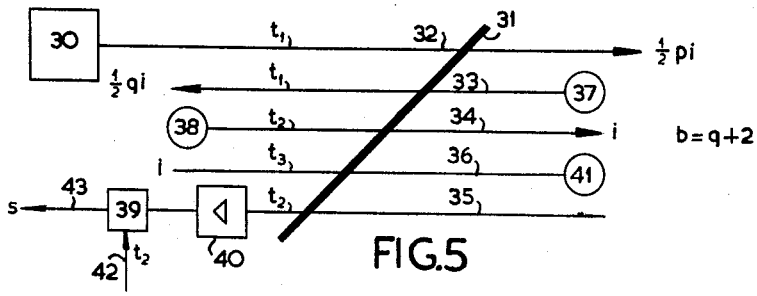

FIG. 5 also shows a ring circuit which supplies a signal when the pulse to be tested lies below a certain lower limit $\frac{1}{2}bi$. This circuit arrangement is evolved from the one shown in FIG. 3 by the substitution of $-p$ and $-q$ for $p$ and $q$ and by furthermore interchanging positive and negative. Thus, for this circuit arrangement, $b=q+2$.

Obviously, in the circuit arrangement shown in FIGS. 2 and 4, the pulse which may be induced in the output winding at the instant $t_1$ can be considered as a signal.

Figure 6:
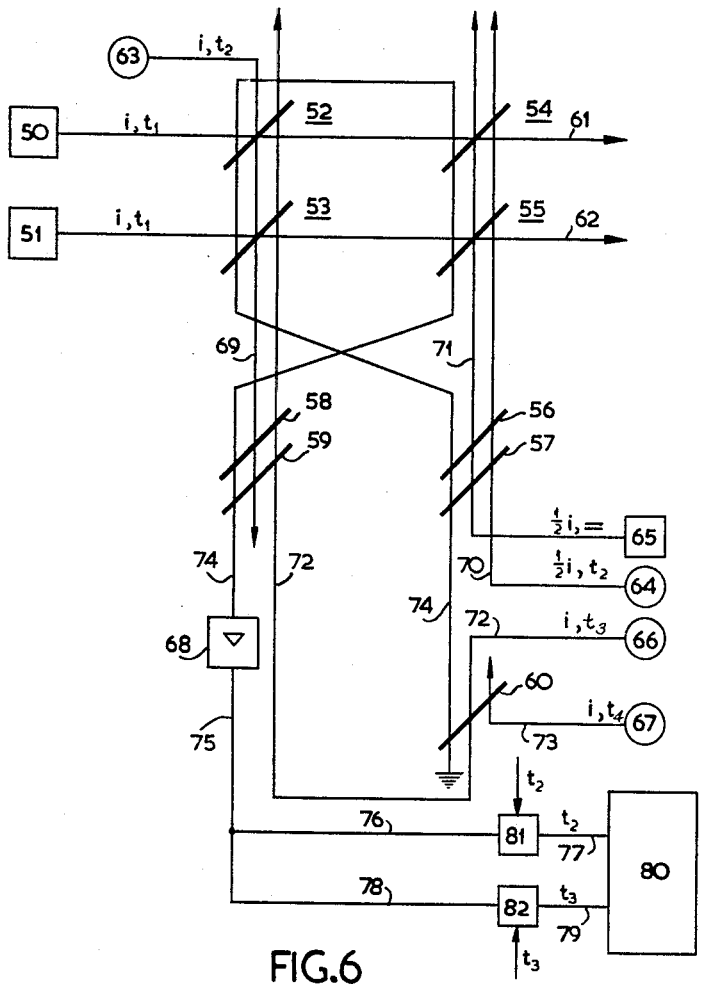
FIG. 6 shows one embodiment of the testing arrangement shown in block form of FIG. 1.

It will be appreciated that by combining one of the two circuit arrangements according to FIGS. 2 and 3 and one of the two circuit arrangements according to FIGS. 4 and 5, a circuit arrangement can be produced which supplies a signal when a pulse to be tested has a current strength lying outside a certain interval. FIG. 6 shows such a circuit arrangement which simultaneously checks two pulse sources 50 and 51 and supplies a signal when one of the pulses supplied by these pulse sources has a current strength differing from $i$. The number of pulse sources to be checked simultaneously may be other than two. In this figure, 50 and 51 denote the pulse sources to be checked, which at the instants $t_1$ supply the pulses to be tested, 65 denotes a direct-current source, which supplies a direct current having the current strength $\frac{1}{2}i$, 63 denotes a pulse source, which at the instants $t_2$ supplies pulses having the current strength $i$, 64 a pulse source which at the instants $t_2$ supplies pulses having the current strength $\frac{1}{2}i$, 66 a pulse source supplying pulses having the current strength $i$ at the instants $t_3$, 67 a pulse source supplying pulses having the current strength $i$ at the instants $t_4$, 68 a pulse amplifier, 81 a gate circuit which passes only the pulses occurring at the instants $t_2$, 82 a gate circuit which passes only the pulses occurring at the instants $t_3$, and 80 denotes the apparatus which receives the pulses supplied by the control arrangement. The ring circuits 52 and 53 correspond to the ring circuits shown in FIG. 5 for $p=2$ and $q=0$. The ring circuit 52 produces a signalling pulse at an instant $t_2$ when the pulse source 50 at the preceding instant $t_1$ has supplied a pulse the current strength of which is less than $i$, and the ring circuit 53 does the same with respect to the pulse source 51. The ring circuits 54 and 55 correspond to the ring circuit shown in FIG. 2 for $p=2$ and $q=1$, except that the adjusting pulses are replaced by a direct current of current strength $\frac{1}{2}i$, which is supplied by the current source 65 so that the reading out pulses supplied by the pulse source 64 must have a current strength of $\frac{1}{2}i$ only. However, they may have a greater current strength, so that the current pulses supplied by the pulse source 63 may also be used for this purpose. The ring circuit 54 supplies a signalling pulse at an instant $t_2$ when the pulse source 50 at the preceding instant $t_1$ has supplied a pulse the current strength of which was greater than $i$, and the ring circuit 55 does the same with respect to the pulse source 51. A signalling pulse induced in the common output winding 74 of the four ring circuits 52, 53, 54, 55 at an instant $t_2$ is amplied in an amplifier 68 and fed to the apparatus 80 through the wires 75, 76, the gate circuit 81 which now is opened and the wire 77. The arrangement includes four rings 56, 57, 58, 59 which in known manner compensate for the parasitic pulses induced in the rings 52, 53, 54, 55. Finally the arrangement contains another ring 60 through which the signalling winding and the wires 72 and 73 connected to the pulse sources 66 and 67 are passed. This ring has the following function. At every instant $t_4$ a pulse supplied by the pulse source 67 brings the ring 60 into a condition which will be referred to as the condition 1. At every instant $t_3$ the ring 60 is brought into the condition 0 by the pulse supplied at that instant by the pulse source 66, so that a signalling pulse is induced in the output winding 74, which is amplified by the amplifier 68 and is fed to the apparatus 80 through the wires 75, 78, the gate circuit 82 which now is open and the wire 79. Thus, this testing arrangement produces a pulse in every period, at the instant $t_3$ through the wire 79 (if the circuit itself is intact) and at the instant $t_2$ through the wire 77 (if one of the two pulse sources 50 and 51 has not operated properly). However, on the occurrence of a fault in the amplifier 68 no pulses are produced at the instant $t_3$ in the wire 78 during every period. The pulse sources 63 to 67, however, are not checked.

It is of particular advantage to use pulse sources of the type shown in FIG. 7. The pulse source shown in this figure comprises a ring 100 of a rectangular magnetic material and a transistor 101. A terminal 102, which hereinafter will be referred to as the cocking terminal, is connected through a winding 103 to a negative terminal B-- of a voltage supply. A positive terminal B′+ of a second voltage supply is connected through a winding 104 to the base of the transistor 101, the emitter of which is connected to earth, while the collector is connecting to an output terminal 107 of the arrangement through a winding 105 and a resistor 106. Finally an input terminal 108 is connected through a winding 109 to a negative terminal B″− of a third voltage supply. The terminals of these voltage supplies which have not been expressly mentioned are connected to earth. The voltage supplies may partly coincide. The windings, which are shown as single conductors threaded through the ring 100 but in actual fact each comprise a number of turns, have the winding directions shown in the figure. This arrangement operates as follows: If for example, at an instant $t_1$ a pulse which has a direction of flow towards the arrangement is supplied to the cocking terminal 102 with sufficient duration and sufficient current strength, the ring 100 is brought into a condition which will be referred to as the condition 1. The voltage which as a result is induced in the winding 105 drives the base of the transistor more highly positive than it was owing to the voltage supply B′+, so that the transistor 101 is only closed more firmly than it was initially. The positive pulse now applied to the collector of the transistor does not cause any change. The changes produced in the arrangement are referred to as the cocking of the arrangement. If now, a pulse having a direction of flow towards the arrangement is applied to the input terminal 108, the ring 100 begins to flip over to the condition 0, so that in the winding 104 a voltage is induced which drives the base of the transistor 100 sufficiently negative to render this transistor conductive. Hence a current starts to flow through the winding 105 which promotes and maintains the passing to the condition 0 of the ring 100. Consequently a very short input pulse causes the occurrence of an output pulse having a current strength and a duration which are substantially independent of the input pulse. The associated phenomena will be referred to as the firing of the arrangement. The following components can be used:

| | |
|---|---|
| Transistor 101 | OC 72. |
| Ring 100 | Four stacked rings 5659140/6E1. |
| Winding 103 | 40 turns (at 20 ma.). |
| Winding 104 | 28 turns. |
| Winding 105 | 8 turns. |
| Winding 109 | 40 turns (at 20 ma.). |

It will be appreciated that the cocking winding 103 can be replaced by a number of parallel connected windings and this enables a pulse source to be constructed which must be cocked in double or multiple coincidence.

FIG. 8 shows a circuit arrangement of the testing member which is substantially analogous to the arrangement shown in FIG. 6. The pulse sources 63, 64, 66 and 67 may be of the type shown in FIG. 7. At an instant $t_5$ the pulse sources 66, 64 and 63 are cocked in series, the pulse source 67 being cocked at the instant $t_2$ in coincidence by the pulses supplied by the pulse source 63 and 64. At the instant $t_1$, the pulse sources 50 and 51 to be checked produce their pulses. At the instant $t_2$, the pulse sources 63 and 64 are fired so that the gate circuit 81 is momentarily opened and the pulse source 67 is cocked in coincidence. If one of the two arrangements 50 and 51 has not operated properly, a signalling pulse is produced in the output winding 74 and fed to the apparatus 80 through a pulse amplifier 68, wires 75, 76, the gate circuit 81, which now is open, and a wire 77. At the instant $t_3$ the pulse source 66 is fired and a gate circuit 82 momentarily opened. As a result the ring 60 is brought to the condition 0. By the flipping over of the ring 60 a pulse is induced in the output winding 74 at the instant $t_3$ and fed to the apparatus 80 through the pulse amplifier 68, the wires 75, 78, the gate circuit 82 which now is open, and the wire 79. At the instant $t_4$ the pulse source 66 is fired so that the ring 60 is returned to the condition 1.

Thus, during each period, the apparatus 80 receives a pulse through the wire 79 at the instant $t_3$ and furthermore a pulse through the wire 77 at the instant $t_2$, when one of the two pulse sources 50 and 51 has not functioned properly. However, on failure of the pulse amplifier 68 or one of the pulse sources 63, 64, 66, 67 the apparatus 80 receives no pulses at the instants $t_3$. This will be clear with respect to failure of the pulse amplifier 68. If one of the pulse sources 63 and 64 has failed, the pulse source 67 is not cocked and hence cannot be fired at the instant $t_3$ so that the ring 60 remains in the condition 1. The same applies to the case of failure of the pulse source 67. With failure of the pulse source 66, the ring remains in the condition 1. If finally the pulse source 65 fails, the apparatus receives a direct current through the wire 77 at the instant $t_2$ in each period. Thus, in all the cases of failure of any component the apparatus 80 receives the information that something has gone wrong and furthermore the nature of this information indicates whether the fault in one of the pulse sources 50, 51 or in the testing arrangement itself.

So far it has been assumed that the ring circuits (31 in FIGS. 2 to 5; 52, 53, 54, 55 in FIGS. 6 and 8) have only a single input winding. Should they be provided with two or more parallel connected input windings, this is obviously equivalent from a technical point of view and consequently the term "input winding" is to be considered as including such a design.

What is claimed is:

1. A circuit for providing an output signal for indicating when the current of an input pulse is not within a predetermined current range, comprising first and second cores of magnetic material having rectangular hysteresis loops, each of said cores having an input winding, an output winding, and a reading-out winding, means applying said input pulses to said input windings, means simultaneously applying read-out pulses to said reading-out windings, said windings and cores being arranged to provide output pulses in the output winding of said first core only when said input pulse exceeds said range, and to provide output pulses in the output winding of said second core only when said input pulse is lower than said range, means serially connecting said output windings, first gate means connected to said output windings to provide a first output signal, means for opening said first gate means only during said read-out pulses, a third core of magnetic material having an output winding connected in series with the output windings of said first and second cores, means for providing a change of state of said third core at a time other than during said read-out pulse, second gate means connected to said output windings to provide a second output signal, and means for opening said second gate means only during the time of a change of state of said third core.

2. A circuit for providing an output signal for indicating when the current of an input pulse is not within a predetermined current range, comprising magnetic circuit means having input winding means, output winding means, and reading-out winding means, means applying said input pulses to said input winding means, a source of read-out pulses, means applying said read-out pulses to said read-out winding means, said magnetic circuit providing an output pulse only when the current of said input pulse is not within said range, and circuit means for indicating the occurrence of said output pulses and errors in said circuit comprising first and second gate means connected to said output winding means to provide first and second output signals, means opening said first gate means only during said read-out pulses, a core of magnetic material having an input winding, an output winding, and a reading-out winding, a source of first pulses connected to said input winding for setting said core to a first state, a source of second pulses connected to said reading-out winding for setting said core to a second state, means connecting said output winding to said output winding means, and means for opening said second gate means only during the occurrence of said second pulses.

3. A circuit for providing an output signal for indicating when the current of an input pulse is not within a predetermined current range, comprising magnetic circuit means having input winding means, output winding means, and reading-out winding means, means applying said input pulses to said input winding means, a source of read-out pulses, means applying said read-out pulses to said read-out winding means, said magnetic circuit providing an output pulse only when the current of said input pulse is not within said range, and circuit means for indicating the occurrence of said output pulses and errors in said circuit comprising a source of cocking pulses, said means applying said read-out pulses comprising first cocking gate means, means applying said cocking pulses to said first cocking gate means, first and second output gate means connected to said output winding means to provide first and second output signals, means applying the output of said first cocking gate means to said first output gate means for opening said first output gate means only during the occurrence of a read-out pulse, a core of magnetic material having an output winding, an input winding, and a read-out winding, a source of first pulses, second cocking gate means applying said first pulses to said input winding, a source of second pulses, third cocking gate means applying said second pulses to said reading-out winding, means connecting said output winding to said output winding means, means applying said cocking pulses to cock said third cocking gate, means applying the output of said first cocking gate to cock said second cocking gate, and means applying the output of said third cocking gate to open said second output gate.

References Cited in the file of this patent
UNITED STATES PATENTS

| | | |
|---|---|---|
| 2,695,993 | Haynes | Nov. 30, 1954 |
| 2,719,962 | Karnaugh | Oct. 4, 1955 |
| 2,907,894 | Bonn | Oct. 6, 1959 |